United States Patent
Naumann et al.

(10) Patent No.: US 7,217,673 B2
(45) Date of Patent: May 15, 2007

(54) SOLARIZATION STABLE BOROSILICATE GLASS AND USES THEREOF

(75) Inventors: Karin Naumann, Ober-Olm (DE); Simone Ritter, Mainz (DE); Franz Ott, Mitterteich (DE); Herbert Stappen, Harxheim (DE)

(73) Assignee: Schott AG, Mainz (DE)

( * ) Notice: Subject to any disclaimer, the term of this patent is extended or adjusted under 35 U.S.C. 154(b) by 369 days.

(21) Appl. No.: 10/468,612

(22) PCT Filed: Feb. 20, 2002

(86) PCT No.: PCT/EP02/01748

§ 371 (c)(1),
(2), (4) Date: Mar. 17, 2004

(87) PCT Pub. No.: WO02/081394

PCT Pub. Date: Oct. 17, 2002

(65) Prior Publication Data

US 2006/0205583 A1 Sep. 14, 2006

(30) Foreign Application Priority Data

Feb. 23, 2001 (DE) .............................. 101 08 992

(51) Int. Cl.
*C03C 3/091* (2006.01)
*C03C 3/093* (2006.01)
*H01J 61/30* (2006.01)

(52) U.S. Cl. .................. 501/66; 501/67; 313/636
(58) Field of Classification Search ................. 501/66, 501/67; 313/636
See application file for complete search history.

(56) References Cited

U.S. PATENT DOCUMENTS

| 5,994,248 | A | 11/1999 | Gandarillas-Lastra et al. |
| 6,284,686 | B1 * | 9/2001 | Marlor ........................ 501/64 |
| 6,589,896 | B1 * | 7/2003 | Marlor ........................ 501/66 |
| 6,635,592 | B1 * | 10/2003 | Kosokabe et al. ............ 501/14 |
| 6,815,385 | B2 * | 11/2004 | Kosokabe et al. ............ 501/21 |

FOREIGN PATENT DOCUMENTS

| DE | 43 06 004 | | 9/1993 |
| DE | 195 45 422 A1 | | 6/1997 |
| EP | 0 735 007 B1 | | 12/1998 |
| EP | 1 178 020 | | 2/2002 |
| JP | 08012369 | * | 1/1996 |
| JP | 08012369 A | | 1/1996 |
| JP | 10036135 A | | 2/1998 |
| WO | 98/55413 | | 12/1998 |

* cited by examiner

Primary Examiner—Karl Group
(74) Attorney, Agent, or Firm—Michael J. Striker

(57) ABSTRACT

The borosilicate glass of the invention is highly resistant to solarization, because it is free of $CeO_2$. Also it contains 0.01 to 0.05 wt. % of $Fe_2O_3$ and 0.05 to 0.8 wt. % of $TiO_2$. This borosilicate glass is especially advantageous for production of flash tubes, gas discharge lamps, and fluorescent tubes for brake lights and display backlights.

12 Claims, 5 Drawing Sheets

—V5a, 33ppm $TiO_2$, 84ppm $Fe_2O_3$, not irradiated
—V5b, 33ppm $TiO_2$, 84ppm $Fe_2O_3$, 100h HOK-4
—V1a, 750ppm $TiO_2$, 84ppm $Fe_2O_3$, not irradiated
—V1b, 750ppm $TiO_2$, 84ppm $Fe_2O_3$, 100h HOK-4
—A1a, 750ppm $TiO_2$, 130ppm $Fe_2O_3$, not irradiated
—A1b, 750ppm $TiO_2$, 130ppm $Fe_2O_3$, 100h HOK-4

— V5a, 33ppm TiO$_2$, 84ppm Fe$_2$O$_3$, not irradiated
— V5b, 33ppm TiO$_2$, 84ppm Fe$_2$O$_3$, 100h HOK-4
— V1a, 750ppm TiO$_2$, 84ppm Fe$_2$O$_3$, not irradiated
— V1b, 750ppm TiO$_2$, 84ppm Fe$_2$O$_3$, 100h HOK-4
— A1a, 750ppm TiO$_2$, 130ppm Fe$_2$O$_3$, not irradiated
— A1b, 750ppm TiO$_2$, 130ppm Fe$_2$O$_3$, 100h HOK-4

— A3a, 4000ppm $TiO_2$, 130ppm $Fe_2O_3$; not irradiated

— A3b, 4000ppm $TiO_2$, 130ppm $Fe_2O_3$; 100h HOK-4

— V4a, 4000ppm $TiO_2$+250ppm $Fe_2O_3$; not irradiated

— V4b, 4000ppm $TiO_2$+250ppm $Fe_2O_3$; 100h HOK-4

— A6a, 1000ppm $TiO_2$+2000ppm $SnO_2$, 130ppm $Fe_2O_3$; not irradiated
— A6b, 1000ppm $TiO_2$+2000ppm $SnO_2$, 130ppm $Fe_2O_3$; 100h HOK-4
— A5a, 1000ppm $TiO_2$+250ppm $MnO_2$, 130ppm $Fe_2O_3$; not irradiated
— A5b, 1000ppm $TiO_2$+250ppm $MnO_2$, 130ppm $Fe_2O_3$; 100h HOK-4

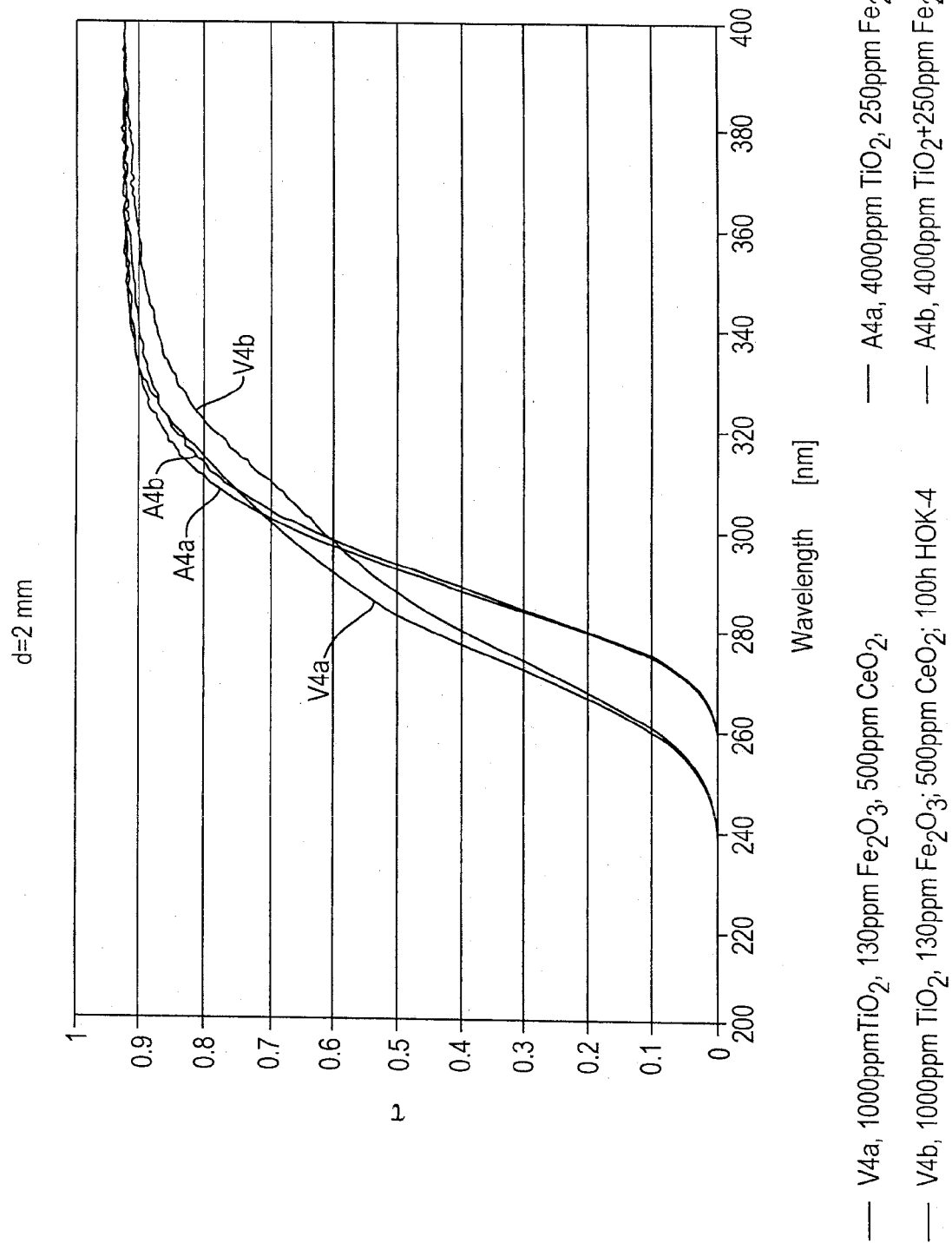

SOLARIZATION STABLE BOROSILICATE GLASS AND USES THEREOF

CROSS-REFERENCE

This is the U.S. National Stage of PCT/EP 02/1748, filed Feb. 20, 2002, which claims the benefit of priority of invention based on DE 101 08 992.9, filed Feb. 23, 2001, in Germany under 35 U.S.C. 365 (b).

BACKGROUND OF THE INVENTION

The invention relates to a solarization-stable borosilicate glass and uses thereof.

Special fluorescent tubes, so-called "backlights", are used for background illumination of, for example, displays of personal computers, laptops, pocket calculators, vehicle navigation systems, for example.

While conventional fluorescent tubes are made of soft glass, which has a low solarization stability, more solarization-stable glass is needed for backlights whose structure corresponds to that of fluorescent tubes in principle, in order to assure long term functionality.

Because of the structure of the backlights, the glass used must be capable of being melted together with tungsten. To this end it must have a thermal expansion matched to the expansion behavior of W. With the thermal expansion coefficient $\alpha_{20/300}$ of W of $4.4\times10^{-6}$/K, glass with $\alpha_{20/300}$ between $3.7\times10^{-6}$/K and $4.2\times10^{-6}$/K is suitable. This is also a difference in respects to the said soft glass, which is melted together with Fe—Ni alloys.

The glass should preferably have a low transformation temperature $T_g$, i.e. Tg<520° C., so that it can be preferably processed at lower temperatures.

The transmission progression of the glass is essential. As high a possible a transparency is demanded in the visible range in order to obtain a high light yield from the lamp, in the UV range a transmission defined in accordance with the purpose is demanded. For example, the effects of harmful UV radiation $\leq 260$ nm must be prevented by means of a corresponding lowering of the UV transmission in order not to let plastics, for example in laptops, become yellowed and brittle. For this, glass with a UV transmission at lambda $\leq 260$ nm tau of <0.7%, measured at 0.2 mm thick samples, is suitable. For flash tubes or gas discharge lamps, transmissions tau at lambda $\leq 260$ nm of $\leq 30\%$ (with 0.2 mm thick samples) are sufficient. The transition from the opaque to the transparent wavelength range should be as short as possible, i.e. in this range the transmission curve should extend as steeply as possible.

The minimum demand made on the transmission in the visible wavelength range is, at tau >400 nm and a sample thickness of 0.2 mm, a transmission of 92%. Thus, the requirement is tau (>400 nm; 0.2 mm)$\geq$92%.

A further essential property of glass for "backlights" is the solarization stability which is required for making possible a long service life of the lamps, i.e. as constant as possible a light yield. Glass is to be considered "solarization stable" here which, following 15 hours of HOK-4 radiation, i.e. a radiation from an Hg high-pressure lamp with a main emission at 365 nm and a radiated strength of 850 µW/cm$^2$ at 200 to 280 nm at a distance of 1 m, shows a transmission drop of less than 5% at 300 nm on a glass sample of 0.2 mm thickness. The demands made on glass for flash tubes, gas discharge lamps and backlights are very similar. All should have the highest possible solarization stability and have a high transmission in the visible range.

Various documents are already known in the patent literature describing more or less solarization-stable glass, in particular glass for lamps. However, this glass has the most varied disadvantages, in particular a solarization stability which does not meet the present-day high requirements.

U.S. Pat. No. 5,994,248 describes a headlight lens made of glass of a very broad composition range, part of which is $SiO_2$, and wherein $Al_2O_3$, $B_2O_3$, earth alkali oxides and alkali oxides, as well as small amounts of iron oxide can be further components. However, the $K_2O$ portion is only allowed to lie between 0 and 1 weight-%.

The properties which are essential for backlights, flash tubes and gas discharge lamps, such as solarization stability and a thermal expansion matched to tungsten, are not of importance here.

DE 195 45 422 A1 relates to a bonded glass for anodic bonding of silicon components with glass components, which has a high content of $Li_2O$ and contains high $Fe_2O_3$/FeO dopings.

JP 10-36135 A describes glass for electronic image capturing. In this case the lowest possible α-radiation of the glass is essential. To this end, in a wide basic glass composition the U, Th, Ra contents are <100 ppb, and the contents of $Fe_2O_3$, $TiO_2$, PbO, ZrO are >100 ppm.

EP 0 735 007 B1 describes a solid lead- and arsenic-free glass with resistance against solarization, containing defined amounts of $SnO_2$ and $CeO_2$, by means of which the solarization stability is increased, but not to a satisfactory degree.

The same applies to the glass containing $CeO_2$ and $Fe_2O_3$ in WO 98/55413.

The closest prior art is represented by JP 8-12369 A. For UV blocking, the borosilicate glass for gas discharge lamps described therein contains a total of 0.03 to 3 weight-% of at least two of the components $V_2O_5$, $Fe_2O_3$, $TiO_2$ and $CeO_2$. A high transmission and high solarization stability cannot be accomplished by means of these components with in part large individual proportions, nor by their combination.

SUMMARY OF THE INVENTION

It is therefore the object of the present invention to make available a solarization-stable glass which does not let UV (<260 nm) through and has a high transmission in the visible range, as well as a thermal expansion matched to the expansion behavior of tungsten.

This object is attained by a borosilicate glass having a composition as disclosed hereinbelow.

Glass with the desired transmission properties preferably consists of a basic glass system of 70 to 80 weight-% of $SiO_2$, 13 to 18 weight-% of $B_2O_3$, 0.5 to 4 weight-%, preferably 0.5 to <2 weight-% of $Al_2O_3$, alkali oxides, namely preferably 2 to 5 weight-% of $Na_2O$, and 1 to 3 weight-%, preferably >1 to 3 weight-% of $K_2O$, and 0 to 1 weight-% of $Li_2O$, preferably free of $Li_2O$, and optionally earth alkali oxides, namely preferably 0 to 1 weight-% of MgO, 0 to 1 weight-% of CaO and 0 to 1 weight-% of BaO, preferably free of BaO.

The simultaneous presence of $TiO_2$ and $Fe_2O_3$ in definite proportions, namely 0.01 to 0.05 weight-% of $Fe_2O_3$ and 0.05 to 0.8 weight-% of $TiO_2$ is important for the invention.

The respective minimum proportions of $Fe_2O_3$, as well as of $TiO_2$ are necessary for achieving the high degree of solarization stability. A $TiO_2$ content of at least 0.1 weight-% is preferred, a content of at least 0.2 weight-% of $TiO_2$ is particularly preferred, and at least 0.4 weight-% of $TiO_2$ are most particularly preferred. Because of the simultaneous presence of these two components in the amounts mentioned, the UV edge, i.e. the transition between absorption and transmission at the desired wavelength, is maintained.

Higher $Fe_2O_3$ contents than 0.05 weight-% would mean a lowering of the transmission in the range between 350 to approximately 600 nm, which can be blamed on the effects of $Fe^{3+}$. But higher $TiO_2$ contents than 0.8 weight-% would lead to the displacement of the UV edge into the longer wave visible range and therefore to a yellow tint of the glass. Furthermore, when increasing both components past the cited highest contents, ilmenite is formed, which leads to a brown coloration of the glass, and therefore to lowering the transmission.

The glass can contain customary refining agents in customary amounts, for example evaporation refining agents such as Cl and F, but also redox refining agents, which are effective because of their polyvalent cations, for example $SnO_2$ and $Sb_2O_3$, which are preferably present in the glass in respectively 0 to 0.5 weight-%. An $SnO_2$ content between 0 and 0.2 weight-percent is particularly preferred.

Except for unavoidable impurities, the glass does not contain $As_2O_3$, since $As_2O_3$ would have disadvantageous effects on the solarization stability.

The same applies to PbO. Therefore the glass is free of PbO, except for unavoidable impurities.

The glass can contain up to 0.5 weight-%, preferably up to 0.1 weight-% of $MnO_2$. At this order of magnitude it is used as a refining agent and displaces the UV edge into the long wave range.

The glass can contain 0 to 1 weight-% of $ZrO_2$. $ZrO_2$ is mainly of advantage for the chemical resistance of the glass. Higher $ZrO_2$ contents would have a negative effect on melting, and the processing temperature of the glass would become too high. Moreover, there would be the danger of undissolved mixture particles to remain behind. It is preferred to omit the addition of $ZrO_2$, so that the glass is free of $ZrO_2$, except for unavoidable impurities in the form of raw materials or vat corrosion.

Except for unavoidable impurities, the glass is furthermore free of $CeO_2$. This is of great advantage for the transmission properties, because $CeO_2$ has very negative effects on the solarization stability.

Exemplary Embodiments

Customary raw materials were used for producing the sample glass and the comparison glass, i.e. it is not particularly necessary to use expensive low-Fe materials.

The well-homogenized mixture was melted in the laboratory in a Pt-crucible at 1600° C., refined and homogenized. The glass was cast thereafter and cooled at 20 K/h.

Table 1 shows a melting example for a 0.5 molten mass.

TABLE 1

Glass Melt Composition

| Oxide | Weight-% | Raw Material | Original Amount [g] |
|---|---|---|---|
| $SiO_2$ | 74.90 | $SiO_2$ | 670.51 |
| $B_2O_3$ | 16.90 | $H_3BO_3$ | 145.08 |
| $Al_2O_3$ | 1.14 | $Al_2O_3$ | 7.94 |
| $Na_2O$ | 3.73 | $Na_2B_4O_7$ | 101.04 |
| $K_2O$ | 1.44 | $K_2CO_3$ | 18.65 |
| CaO | 0.60 | $CaCO_3$ | 0.1727 |
| MgO | 0.42 | Dolomite | 16.38 |
| NaCl | 0.45 | NaCl | 4.01 |
| $TiO_2$ | 0.40 | $TiO_2$ | 3.36 |
| $Fe_2O_3$ | 0.025 | $Fe_2O_3$ | 0.0913 |

Table 2 shows six examples of glass in accordance with the invention (A1 to A6) with their components in weight-% on an oxide basis and their essential properties.

Table 3 shows the compositions and properties of five pieces of comparison glass (V1 to V5).

0.45 weight-% of NaCl were added to each of the glass mixture. Only about 0.29 weight-% of NaCl can be found in the finished glass pieces.

The following properties are shown in Tables 2 and 3:

the thermal expansion coefficient $\alpha_{20/300}[10^{-6}/K]$;

the transformation temperature Tg [° C.];

the solarization stability, $\Delta_{15\tau}$ (300 nm, 0.2 nm), [%], i.e. the different in transmission $\tau$ between a non-irradiated glass sample of 0.2 mm thickness and an irradiated glass sample of 0.2 mm thickness after 15 hours of irradiation by a HOK-4 lamp;

the transmission $\tau$ at a wavelength ($\lambda$) of 260 nm of a glass sample of 0.2 mm thickness to show that the transmission in the UV range (UV blockage); and the transmission $\tau$ at wavelengths ($\lambda$) greater than 400 nm of a glass sample of 0.2 mm thickness to show that the transmission is high in the visible range.

TABLE 2

Glass Compositions* of the Invention and Their Essential Properties

| | A1 | A2 | A3 | A4 | A5 | A6 |
|---|---|---|---|---|---|---|
| $SiO_2$ | 75.17 | 74.57 | 74.92 | 74.90 | 75.13 | 75.00 |
| $B_2O_3$ | 16.96 | 16.94 | 16.90 | 16.90 | 16.95 | 16.92 |
| $Al_2O_3$ | 1.15 | 1.65 | 1.14 | 1.14 | 1.15 | 1.15 |
| $Na_2O$ | 3.74 | 3.73 | 3.73 | 3.73 | 3.74 | 3.73 |
| $K_2O$ | 1.45 | 1.45 | 1.44 | 1.44 | 1.45 | 1.44 |
| CaO | 0.60 | 0.60 | 0.60 | 0.60 | 0.60 | 0.60 |
| MgO | 0.42 | 0.42 | 0.42 | 0.42 | 0.42 | 0.42 |
| $TiO_2$ | 0.075 | 0.200 | 0.400 | 0.400 | 0.100 | 0.100 |
| $SnO_2$ | — | — | — | — | — | 0.200 |
| $MnO_2$ | — | — | — | — | 0.025 | — |
| $Fe_2O_3$ | 0.013 | 0.01 | 0.013 | 0.025 | 0.013 | 0.013 |
| $\alpha_{20/300}$ [$10^{-6}$/K] | 3.84 | 3.84 | 3.88 | 3.80 | 3.82 | 3.88 |
| Tg [° C.] | 503 | 495 | 511 | 496 | 496 | 504 |
| $\Delta_{15\tau}$ (300 nm, 0.2 mm), [%] | 4.4 | 2.2 | 2.1 | 2.4 | 3.8 | 4.3 |
| $\tau$ (260 nm; 0.2 mm) [%] | 21 | 8.7 | 0.6 | 0.3 | 15.7 | 18.7 |
| $\tau$ (>400 nm, 0.2 mm) [%] | >92 | >92 | >92 | >92 | >92 | >92 |

*Amounts of ingredients are given in percent by weight on an oxide basis.

TABLE 3

Comparison Compositions* and Their Properties

| | V1 | V2 | V3 | V4 | V5 |
|---|---|---|---|---|---|
| $SiO_2$ | 75.17 | 75.22 | 74.57 | 75.11 | 75.22 |
| $B_2O_3$ | 16.96 | 16.97 | 16.94 | 16.95 | 16.97 |
| $Al_2O_3$ | 1.15 | 1.15 | 1.65 | 1.15 | 1.15 |
| $Na_2O$ | 3.74 | 3.74 | 3.73 | 3.74 | 3.74 |
| $K_2O$ | 1.45 | 1.45 | 1.45 | 1.45 | 1.45 |
| CaO | 0.60 | 0.60 | 0.60 | 0.60 | 0.60 |
| MgO | 0.42 | 0.42 | 0.42 | 0.42 | 0.42 |
| NaCl | 0.45 | 0.45 | 0.45 | 0.45 | 0.45 |
| $TiO_2$ | 0.075 | 0.034 | 0.200 | 0.100 | 0.0033 |
| $CeO_2$ | — | — | — | 0.05 | — |
| $Fe_2O_3$ | 0.0084 | 0.013 | 0.0084 | 0.013 | 0.0084 |
| $\alpha_{20/300}$ [$10^{-6}$/K] | n.d.** | 3.55 | n.d. | n.d. | n.d. |
| Tg [° C.] | n.d. | 497 | n.d. | n.d. | n.d. |

TABLE 3-continued

Comparison Compositions* and Their Properties

|  | V1 | V2 | V3 | V4 | V5 |
|---|---|---|---|---|---|
| $\Delta_{15\tau}$ (300 nm, 0.2 mm), [%] | 5.8 | 5.5 | 6.7 | 5.8 | 7.8 |
| $\tau$ (260 nm; 0.2 mm) [%] | 41.3 | 39.8 | 9.6 | 11 | 65.8 |
| $\tau$ (>400 nm; 0.2 mm) [%] | >92 | >92 | >92 | >92 | >92 |

*Amounts of ingredients are given in percent by weight on an oxide basis.
**n.d. = not determined.

BRIEF DESCRIPTION OF THE DRAWING

FIGS. 1 to 5 show the transmission curves $\tau$ vs. $\lambda$ tau over lambda (200 to 400 nm) for some exemplary and comparison examples (a) before and (b) after irradiation.

Figure 1:
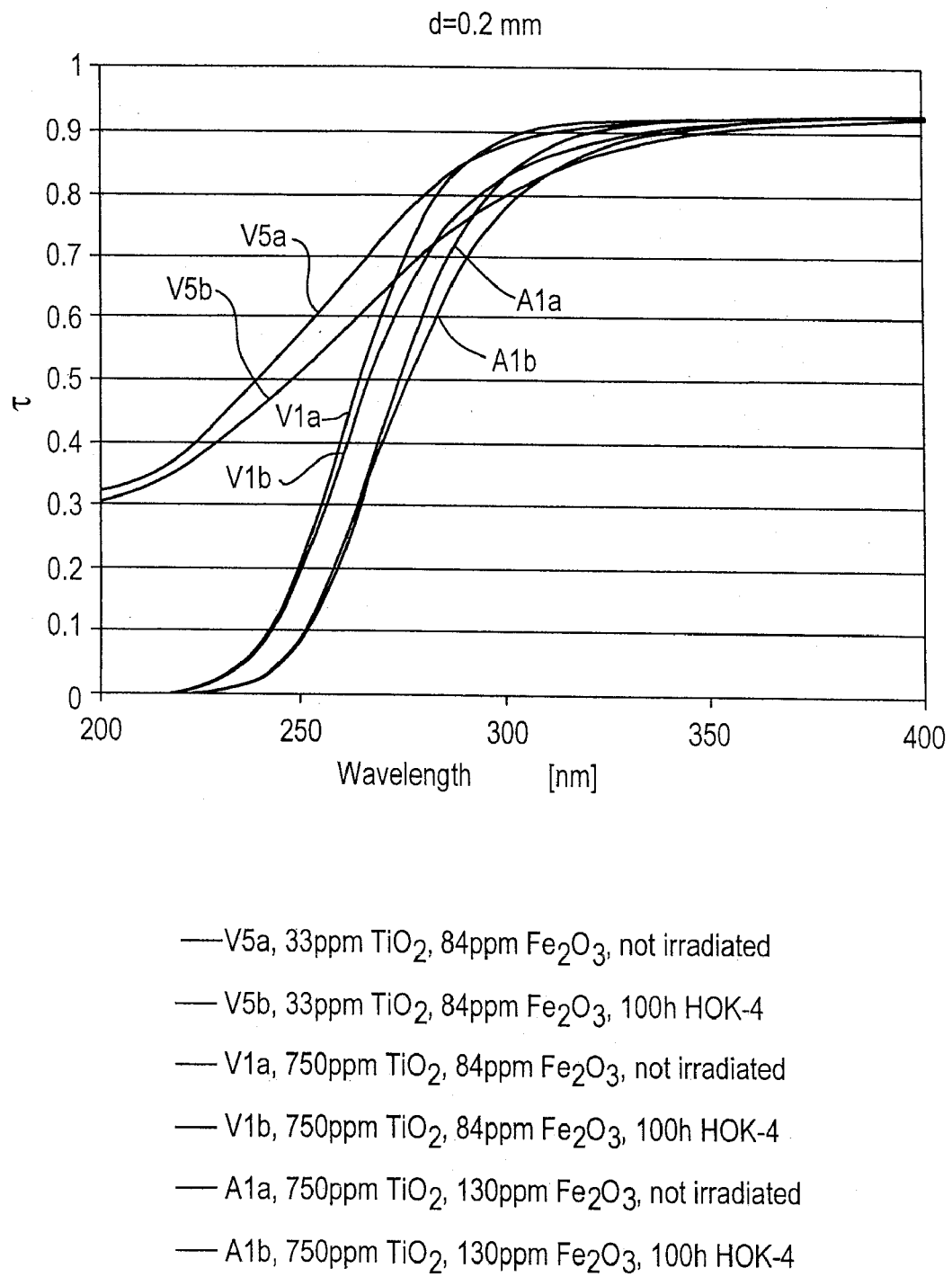

In detail:

FIG. 1: A1 and V1, V5, respectively not irradiated and following 100 hours of irradiation by means of an HOK-4 lamp (sample thickness: 0.2 mm)

Figure 2:
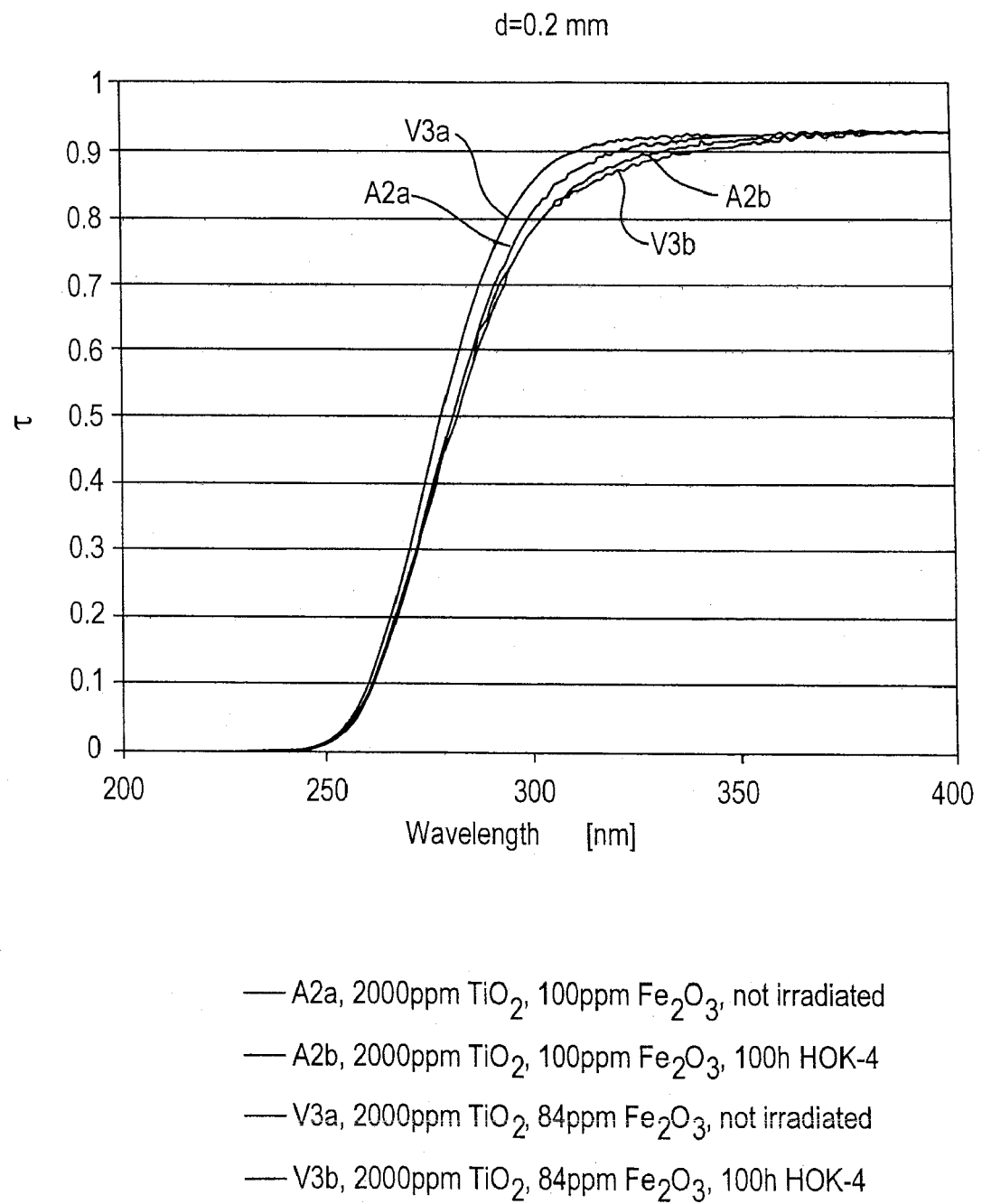

FIG. 2: A2 and V3, respectively not irradiated and following 100 hours of irradiation by means of an HOK-4 lamp (sample thickness: 0.2 mm)

Figure 3:
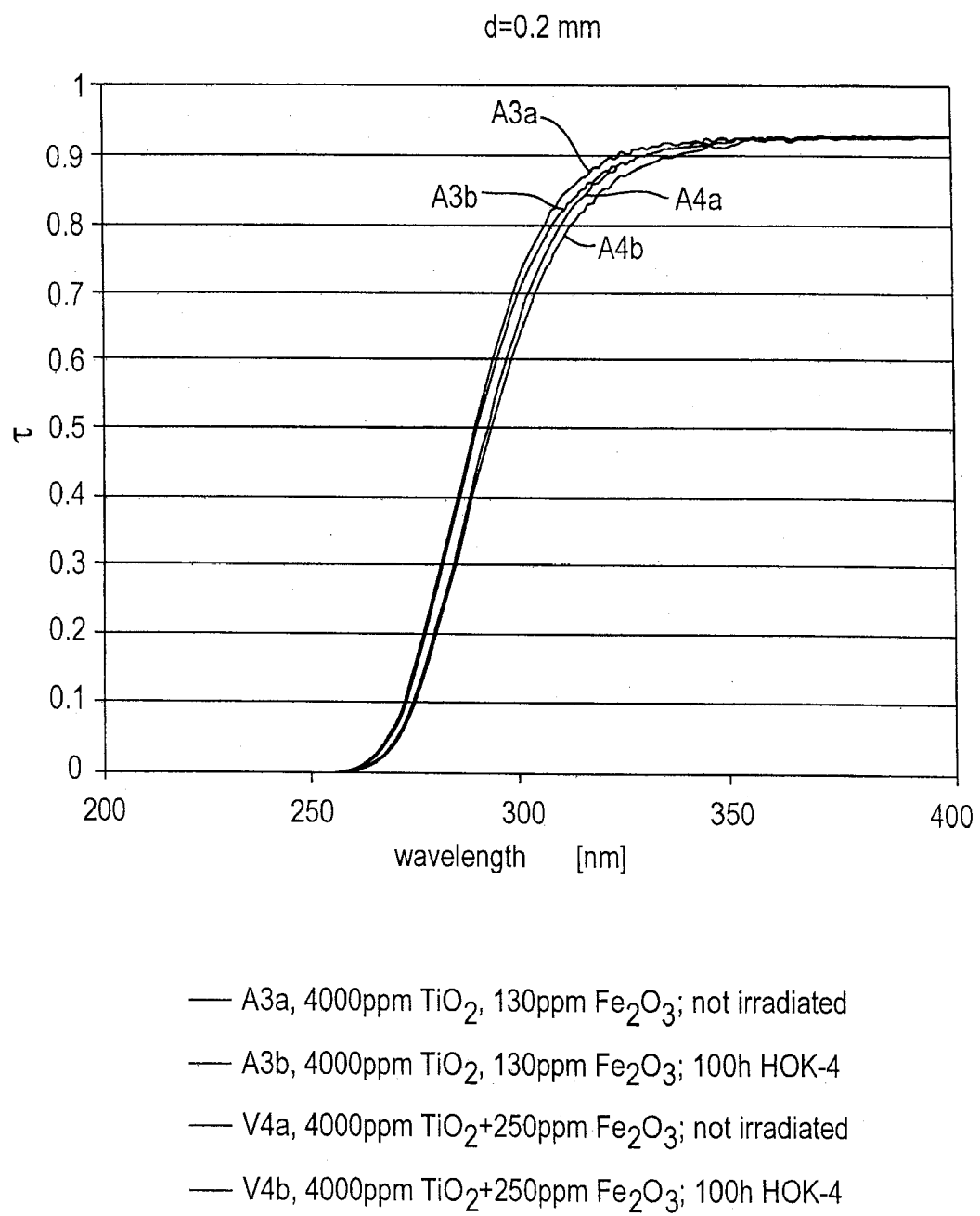

FIG. 3: A3, A4, respectively not irradiated and following 100 hours of irradiation by means of an HOK-4 lamp (sample thickness: 0.21 mm)

Figure 4:
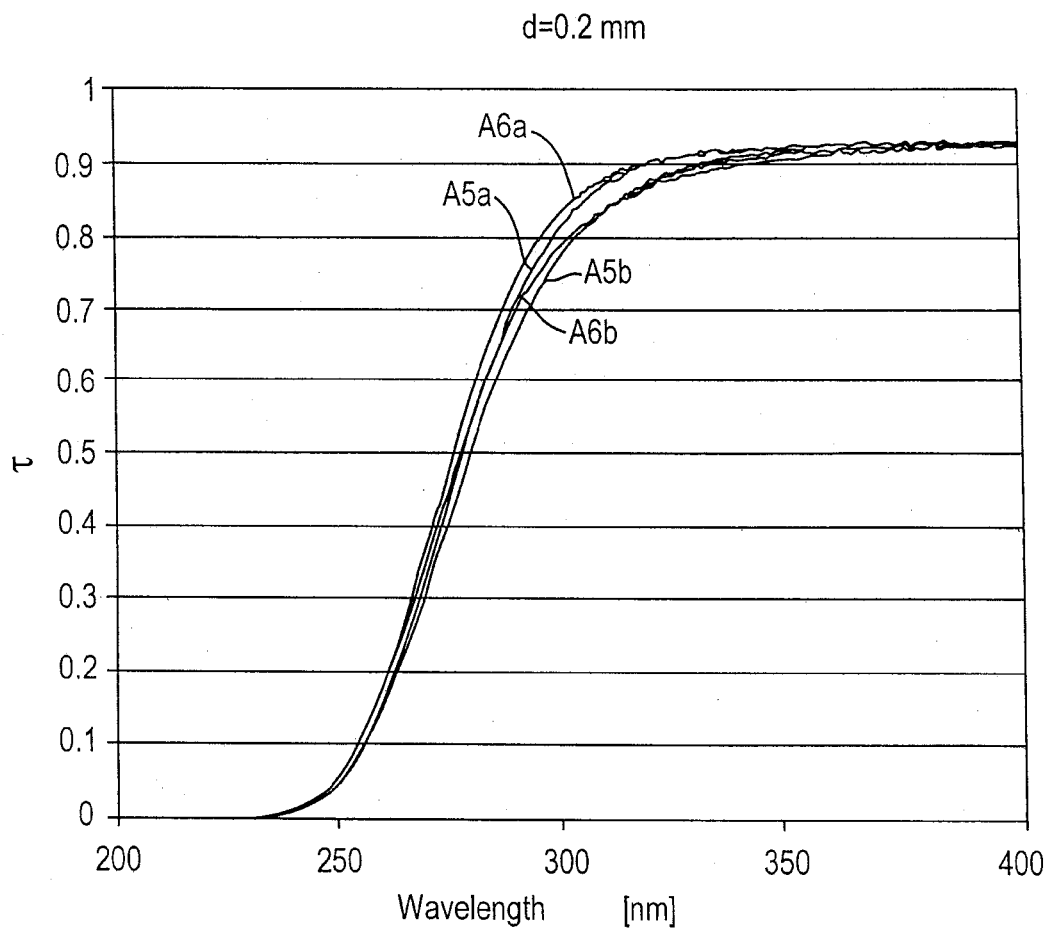

FIG. 4: A5, A6, respectively not irradiated and following 100 hours of irradiation by means of an HOK-4 lamp (sample thickness: 0.21 mm)

FIG. 5: A4 and V4, respectively not irradiated and following 100 hours of irradiation by means of an HOK-4 lamp (sample thickness: 0.2 mm).

The figures document that the desired transmission progression is achieved by means of the special contents of $TiO_2$ and $Fe_2O_3$, which is represented in particular by the comparison with the samples V1, V5, V3, which are low in $Fe_2O_3$, or the samples V2, V5, which are low in $TiO_2$. The importance of the lack of $CeO_2$ for the transmission is also made clear.

The figures, as well as the $\Delta_{15\tau}$ (300 nm, 0.2 mm) given in the tables make clear the differences in the solarization stability between the glass of the invention and the comparison glass. The negative effect of $CeO_2$ becomes clear in the comparison between V4 and, for example, A5 or A6, but in particular with A1 (see tables 2 and 3) or A4 (see FIG. 5).

The glass in accordance with the invention has a high degree of solarization stability, expressed by $\Delta_{15\tau}$ (300 nm, 0.2 mm) of 5%, a high transmission in the visible range (see the course of transmission), in particular expressed by $\tau$ (>400 nm; 0.2 mm)$\geq$92%, and good UV blocking (see the course of transmission), in particular expressed by $\tau$ ($\leq$260 nm; 0.2 mm)$\leq$30%.

The glass moreover has a transformation temperature $T_g$<520° C., so that it can be easily worked.

The glass furthermore has a thermal expansion coefficient $\alpha_{20/300}$ between $3.7\times10^{-6}$/K and $4.2\times10^{-6}$/K. It is therefore well matched to the thermal expansion properties of tungsten, i.e. it can be melted together with W.

With these properties, glass is well suited for producing lamp bulbs for flash tubes and for gas discharge lamps.

In preferred embodiments with comparatively high $TiO_2$ contents, the glass shows good UV blocking, in particular expressed by tau ($\leq$260 nm; 0.2 mm)$\leq$0.7%.

Therefore the glass is outstandingly suitable for producing "backlights", for example for the background lighting of, for example, displays of personal computers, laptops, notebooks, pocket calculators, vehicle navigation systems, scanners, but also of mirrors and pictures.

In the same way it is well suited for producing brake lights for vehicles. The third, additional, brake light in particular can preferably be produced by means of such a special fluorescent tube.

The invention claimed is:

1. A borosilicate glass that is free of $CeO_2$ and that has a composition, in percent by weight on an oxide basis, of:

| | |
|---|---|
| $SiO_2$ | 70–80 |
| $B_2O_3$ | 13–18 |
| $Al_2O_3$ | 0.5–4 |
| $Li_2O$ | 0–1 |
| $Na_2O$ | 2–5 |
| $K_2O$ | 1–3 |
| MgO | 0–1 |
| CaO | 0–1 |
| BaO | 0–1 |
| $Fe_2O_3$ | 0.01–0.05 |
| $TiO_2$ | 0.05–0.8. |

2. The borosilicate glass as defined in claim 1, wherein said composition comprises from 0.5 to less than 2 percent by weight of said $Al_2O_3$.

3. The borosilicate glass as defined in claim 1, wherein said composition contains at least 0.1 percent by weight of said $TiO_2$.

4. The borosilicate glass as defined in claim 1, wherein said composition contains at least 0.2 percent by weight of said $TiO_2$.

5. The borosilicate glass as defined in claim 1, wherein said composition additionally contains from 0 to 1 percent by weight of $ZrO_2$, from 0 to 0.5 percent by weight of $SnO_2$, from 0 to 0.1 percent by weight of $MnO_2$, and from 0 to 0.5 percent by weight of $Sb_2O_3$.

6. The borosilicate glass as defined in claim 1, which is free of PbO and $As_2O_3$ except for unavoidable impurities thereof.

7. The borosilicate glass as defined in claim 1, having a transmission drop ($\Delta_{15\tau}$) through a glass sample of 0.2 mm thickness of less than 5% after HOK-4 irradiation for 15 hours at a wavelength of 300 nm.

8. The borosilicate glass as defined in claim 1, with a transformation temperature (Tg) less than 520° C., with a thermal expansion coefficient ($\alpha_{20/300}$) between $3.7\times10^{-6}$/K to $4.2\times10^{-6}$/K, and a transmission ($\tau$) for transmission through a glass sample of 0.2 mm thickness of less than or equal to 30 percent at wavelengths less than or equal to 260 nm.

9. The borosilicate glass as defined in claim 8, wherein said transmission ($\tau$) is less than or equal to 0.7 percent.

10. A fluorescent tube for a brake light or for a background light of a display, said fluorescent tube comprising a borosilicate glass, wherein said borosilicate glass is free of $CeO_2$ and has a composition, in percent by weight on an oxide basis, of:

| | |
|---|---|
| $SiO_2$ | 70–80 |
| $B_2O_3$ | 13–18 |
| $Al_2O_3$ | 0.5–4 |
| $Li_2O$ | 0–1 |
| $Na_2O$ | 2–5 |
| $K_2O$ | 1–3 |
| MgO | 0–1 |
| CaO | 0–1 |
| BaO | 0–1 |
| $Fe_2O_3$ | 0.01–0.05 |
| $TiO_2$ | 0.05–0.8. |

11. A flash tube comprising a borosilicate glass; wherein said borosilicate glass is free of $CeO_2$ and has a composition, in percent by weight on an oxide basis, of:

| | |
|---|---|
| $SiO_2$ | 70–80 |
| $B_2O_3$ | 13–18 |
| $Al_2O_3$ | 0.5–4 |
| $Li_2O$ | 0–1 |
| $Na_2O$ | 2–5 |
| $K_2O$ | 1–3 |
| MgO | 0–1 |
| CaO | 0–1 |

-continued

| | |
|---|---|
| BaO | 0–1 |
| $Fe_2O_3$ | 0.01–0.05 |
| $TiO_2$ | 0.05–0.8. |

12. A gas discharge lamp comprising a borosilicate glass; wherein said borosilicate glass is free of $CeO_2$ and has a composition, in percent by weight on an oxide basis, of:

| | |
|---|---|
| $SiO_2$ | 70–80 |
| $B_2O_3$ | 13–18 |
| $Al_2O_3$ | 0.5–4 |
| $Li_2O$ | 0–1 |
| $Na_2O$ | 2–5 |
| $K_2O$ | 1–3 |
| MgO | 0–1 |
| CaO | 0–1 |
| BaO | 0–1 |
| $Fe_2O_3$ | 0.01–0.05 |
| $TiO_2$ | 0.05–0.8. |

* * * * *